(12) United States Patent
Avrahami et al.

(10) Patent No.: US 8,429,228 B1
(45) Date of Patent: Apr. 23, 2013

(54) METHOD FOR CREATING MANIPULATING EXCHANGING AND DISTRIBUTING INFORMATION MESSAGES OF ORGANIZED DATA STRUCTURE

(75) Inventors: Gil Avrahami, Rishon Le-Zion (IL); Shahar Zer, Zichron-Yaacov (IL); Eran Sagi, Ramat Hasahron (IL)

(73) Assignee: Point of View Software Ltd., Herzliya Pituach (IL)

( * ) Notice: Subject to any disclaimer, the term of this patent is extended or adjusted under 35 U.S.C. 154(b) by 82 days.

(21) Appl. No.: 13/249,833

(22) Filed: Sep. 30, 2011

(51) Int. Cl.
*G06F 15/16* (2006.01)
(52) U.S. Cl.
USPC .......................................... 709/204; 709/288
(58) Field of Classification Search .................. 709/204, 709/288
See application file for complete search history.

(56) References Cited

U.S. PATENT DOCUMENTS

| | | | | |
|---|---|---|---|---|
| 6,606,744 B1 * | 8/2003 | Mikurak | ....................... | 717/174 |
| 6,671,818 B1 * | 12/2003 | Mikurak | ....................... | 714/4.21 |
| 7,020,697 B1 * | 3/2006 | Goodman et al. | ............ | 709/223 |
| 7,124,101 B1 * | 10/2006 | Mikurak | ......................... | 705/35 |
| 7,130,807 B1 * | 10/2006 | Mikurak | ....................... | 705/7.25 |
| 7,467,198 B2 * | 12/2008 | Goodman et al. | ............ | 709/223 |
| 7,716,077 B1 * | 5/2010 | Mikurak | ....................... | 705/7.12 |
| 7,957,991 B2 * | 6/2011 | Mikurak | ....................... | 705/7.11 |
| 8,032,409 B1 * | 10/2011 | Mikurak | .................... | 705/14.39 |
| 8,271,336 B2 * | 9/2012 | Mikurak | ......................... | 705/22 |

* cited by examiner

*Primary Examiner* — Tammy Nguyen
(74) *Attorney, Agent, or Firm* — The Law Office of Michael E. Kondoudis

(57) ABSTRACT

The present invention provides a system for creating, manipulating, g and distributing information message of organized data structure. The system is comprised of: an application installed on a terminal, said application includes: an information module for receiving and transmitting update information messages and an organizing data module enabling organizing information data into structured table format, the organizing include searching, sorting, filtering manipulating and editing the information data, a message distribution module for defining a query which represents the organized information in the structure format based on a user operations and associating the query with and information message having predefined format and transmit the information messages according to user distribution list, a web server application including: a table data management module enabling online creating, manipulating filtering, sorting and searching of information data tables and a data exchange module for managing distribution information messages between information sources and target mobile users.

21 Claims, 16 Drawing Sheets

METHOD FOR CREATING MANIPULATING EXCHANGING AND DISTRIBUTING INFORMATION MESSAGES OF ORGANIZED DATA STRUCTURE

TECHNICAL FIELD

The present invention relates to the field of data messaging services, and more particularly, to wireless communication messaging services.

BACKGROUND ART

Two major categories of electronic information transmission are presently available and widely used. The first category of messages is text-based messages. These types of messages may be transferred from one person to another or from one person to a group of people via services such as e-mail or SMS (Short Message Service). The second category is file messages, i.e. transferring any type of file or files such as text documents, electronic sheets, presentations, pictures, video, or audio that may be sent via services such as e-mail, MMS (Multi-Media Message Service), or FTP (File Transfer Protocol).

Both categories of electronic messaging described above involve sending offline information, that is, information that has been written or otherwise compiled at a specific date and time and remains static when transferred through a messaging service. These existing options are sufficient for sending many types of data. However, in a constantly changing world, the need arises for the ability to transmit dynamic, or online, information.

This need is especially apparent when the data being transferred is dynamic in nature and is constantly being updated, such as in an online database.

For example, a financial consultant in a bank deals with customers or employees who are interested in the current value of stocks. This person needs the ability to send messages to other people, a list of all the available stocks including many online details about them: stock number, stock name, stock value, etc. Then, the addressee needs the ability to navigate through all this information and filter it until he finds the most suitable candidate stocks for investment. Then, he wants to reply the financial consultant with his selected stocks. The addressee can also send the information to another person for a second opinion. This messaging process can include an unlimited amount of addressees.

Prior art techniques of exchanging information are not practical for reviewing and navigating through hundreds or thousands (or even more) of stocks for investments, received as a text via E-mail or an SMS. Furthermore, this information is received in offline format such as files (like: text documents, electronic sheets, etc.), thus, part of this information may be already not relevant as the information has already been updated. In our example, an opened file that contains a list of stocks, the values of these stocks have probably changed in reference to the time the information was sent.

SUMMARY OF INVENTION

The present invention provides a method for creating manipulating exchanging and distributing information messages of organized table data structure between at least two wireless computerized terminals of different users. The methods comprise the steps of: providing an mobile application on the wireless computerized terminal for organizing information data by a first user into table structured format, wherein the information data is retrieve from defined databases or manually inserted by the user, the organizing include user operation of searching, sorting, filtering manipulating and editing the information data, defining a query which represents the organized information in the structure format based on first user operations and associating said query with and information message having predefined format, enabling to distribute information message to at least one second user through wireless communication data network, providing a second user with a mobile application on the wireless computerized terminal having the following capabilities: enabling to receive the distributed information message, organizing the received message information in the same table structured format as created by the first user according to associated query and enabling manipulating, editing, searching, sorting, filtering the data rerecords by the second user, defining a query which represents the organized information in the structure format based on second user operations and associating said query with and information message having predefined format, enabling to distribute information message to at least one second user through wireless communication data network and enabling to distribute information message to at least one other user through wireless communication data network.

According to some embodiments of the present invention the associating includes assigning an identification number for the created query and including this number in the information message.

According to some embodiments of the present invention the associating includes insertion of the query in the information message.

According to some embodiments of the present invention the mobile communication application further enables to view data records of information tabled filtered by the transmitting user.

According to some embodiments of the present invention the mobile application further enables to follow-up feedback to information message which define multiple choice table to plurality of second users, said follow-up enabling to aggregate second users selections.

According to some embodiments of the present invention the follow-up further includes monitoring re-usage of information messages by secondary users and their distribution statistics.

According to some embodiments of the present invention the table structured format is transformed to one of the following: graphical format, time line, or map format.

According to some embodiments of the present invention comprising campaign management tool for planning optimized information messages distribution according to marketing requirements.

According to some embodiments of the present invention the information table initially originated by a private user can be edited by recipient users including adding, deleting or changing information, wherein the information message is saved in one of the following options: overriding the last version of the information table, creating new version of the information table and saving previous message or recording of the changes in association with the information table.

The present invention provides a system for creating, manipulating, exchanging and distributing information of organized data structure between at least two computerized terminals of different users. The system is comprised of:

an application installed on a mobile phone device, said application including: an information module for receiving and transmitting update information messages of multiple data sources and an organizing data module enabling organizing information data by a user into structured table format, wherein the information data is retrieve from defined databases or manually inserted by the user, the organizing include searching, sorting, filtering manipulating and editing the information data, a message distribution module for enabling defining a query which represents the organized information in the structure format based on first user operations and associating said query with and information message having predefined format and transmit the information messages according to user distribution list, a web server application including: I. a tables data management module enabling online creating/updating/manipulating/filtering sorting and searching of information data tables of plurality of data information providers and a data exchange module managing distribution information messages between plurality of information sources and target mobile users.

According to some embodiments of the present invention the associating includes assigning an identification number for the created query and including this number in the information message.

According to some embodiments of the present invention associating includes including the inserting the query in the information message.

According to some embodiments of the present invention the mobile communication application further enables to view data records of information tabled filtered by the transmitting user.

According to some embodiments of the present invention the mobile application further enables to follow-up feedback to information message which define multiple choice table to plurality of second users, said follow-up enabling to aggregate second users selections.

According to some embodiments of the present invention the follow-up further include monitoring re-usage of information messages by secondary users and their distribution statistics.

According to some embodiments of the present invention the table structured format can be presented by one of the following: graphical format, time line or map format.

According to some embodiments of the present invention the system further comprising campaign management tool for planning optimized information messages distribution according to marketing requirements.

According to some embodiments of the present invention the information table initially originated by a private user can be edited by recipient users including adding, deleting or changing information, wherein the information table is saved in one of the following options: overriding the last version of the information table, creating new version of the information table or recording of the changes in association with the information table.

According to some embodiments of the present invention the client application is programmed to locate in the user's contact list all users which installed the designated client application on their phone device, providing the user an updated list with all users having the designated application.

According to some embodiments of the present invention the information message is distributed automatically according to at least one of user geographical location, predefined scheduling rules, user profile rules.

According to some embodiments of the present invention the information messages are associated with a social Network, enabling users to send and receive information messages through the social networks.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention incorporates by reference U.S. Pat. No. 7,225,195.

The present invention, in some embodiments thereof, provides methods and systems for creating, editing and exchanging information messages which include table structured data information. The table structured data information may be organized as information tables, graphical data structures representation, time line or graphical map. Each user is provided with GUI functionalities of creating, searching, manipulating, filtering or marking/selecting data items in the table structured information records. The information messages exchanged by the user provide all the original data information created by the first user and all instructions codes of operations executed by at least one user which forwarded the message to the current user.

The term "information message" or "table structured format data information" according to the present invention may include: Text such as shopping lists, To-Do lists, etc., Multi-Media objects such as products & services catalogues, video/audio Play Lists, Photo Albums, etc, Voting format, for example group of friends wants to decide where to go out, or TV reality show enables its viewers to vote for candidates, etc., Surveys format—a list of questions with various answering options, etc.

The term "information message" may further include query or link for table structured format data information According to some embodiments of the present invention the structured data information may be implemented in a table structure format including rich content each column can include various data formats: text, number, date, multi-media (picture, movie, voice, etc.), etc.

Figure 1:
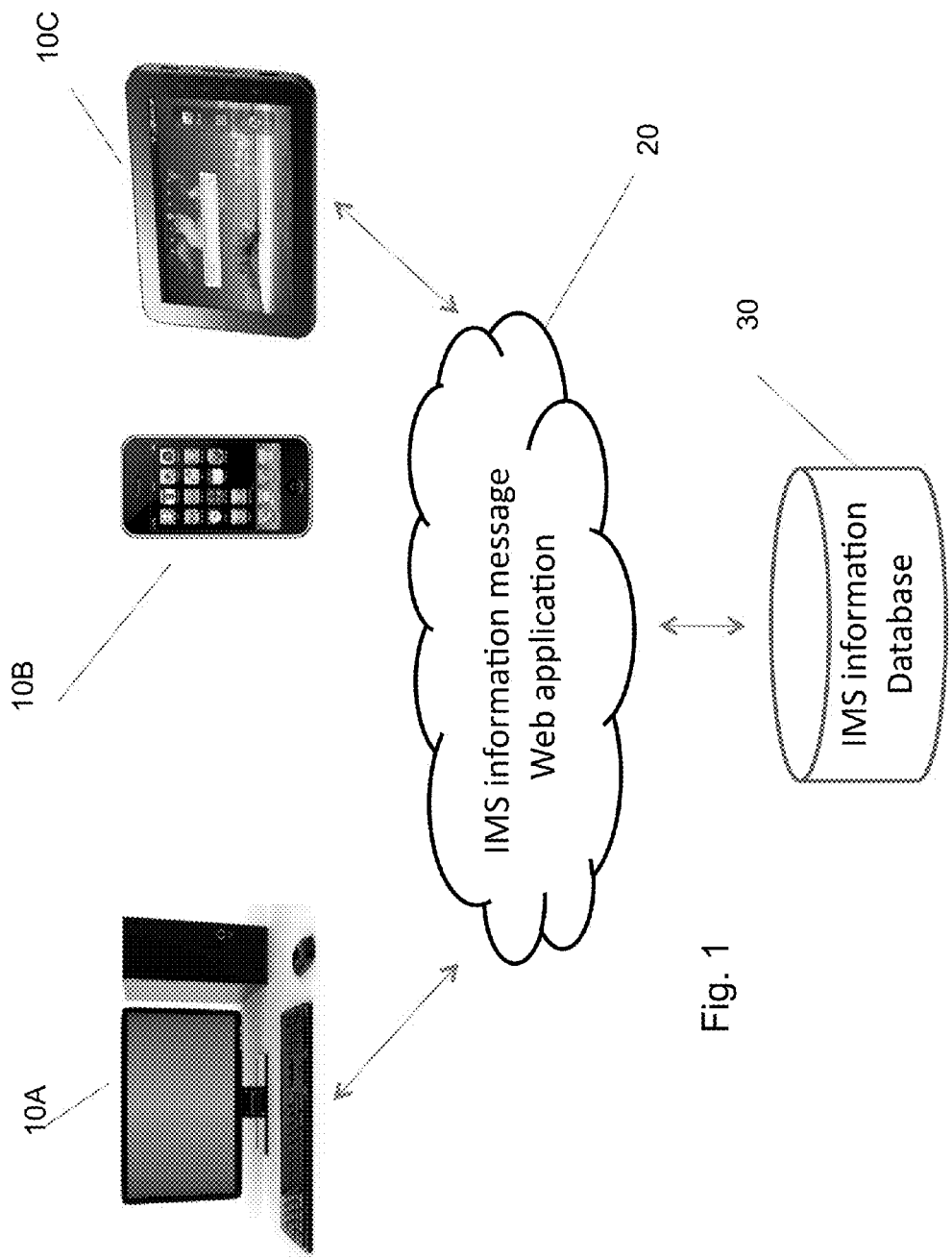
FIG. 1 is a in a overview of information messaging system architecture according to according to some embodiments of the invention.

The content of the table structured information data is updated on Real-Time to the time of opening the message FIG. 1 is a in an overview of information messaging system architecture according to some embodiments of the invention. Users terminals such computer device 10A, smart phone 10B or tablet device 10C include designated messaging application communication enabling to distribute information messages through designated messaging web platform 20 and retrieving the information message data from designated information messages database 30.

Figure 2:
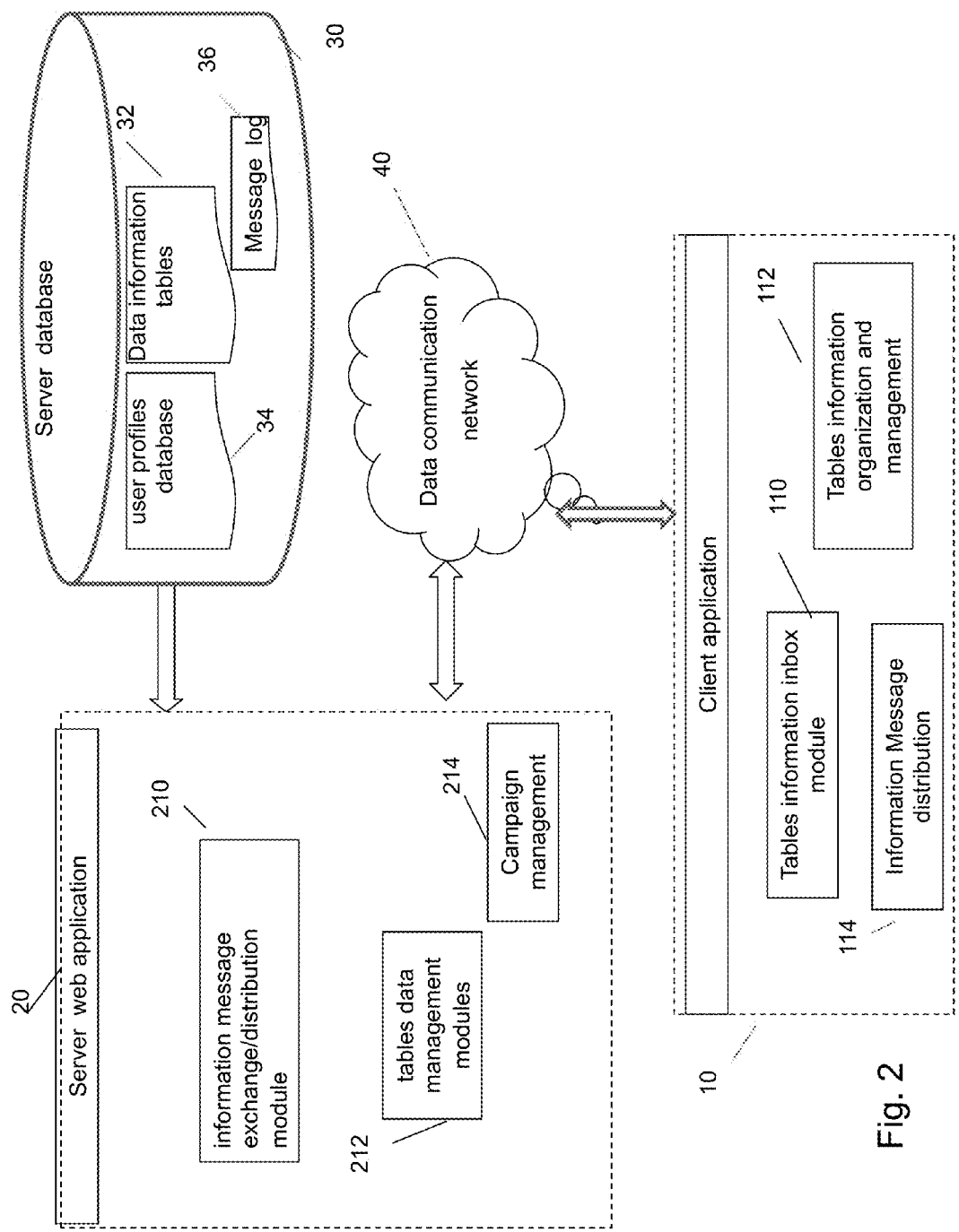
FIG. 2 is a block diagram of information messaging system components according to some embodiments of the invention.

FIG. 2 is a block diagram of information messaging system components according to some embodiments of the invention. The messaging system comprises a client application 10 which provide the user with tools for creating, receiving, editing and transmitting information messages, the messages are transmitted through server web application 20 which provide tools for distributing information messages: module 210, module 212 for managing table structured information data such as data tables and campaign management module 214. Database 30 comprises user profile records 34 data information table 32 including a catalogue of business information and/or private users table structured information data 32 and messages log 36 which include history of message usage.

Figure 3:
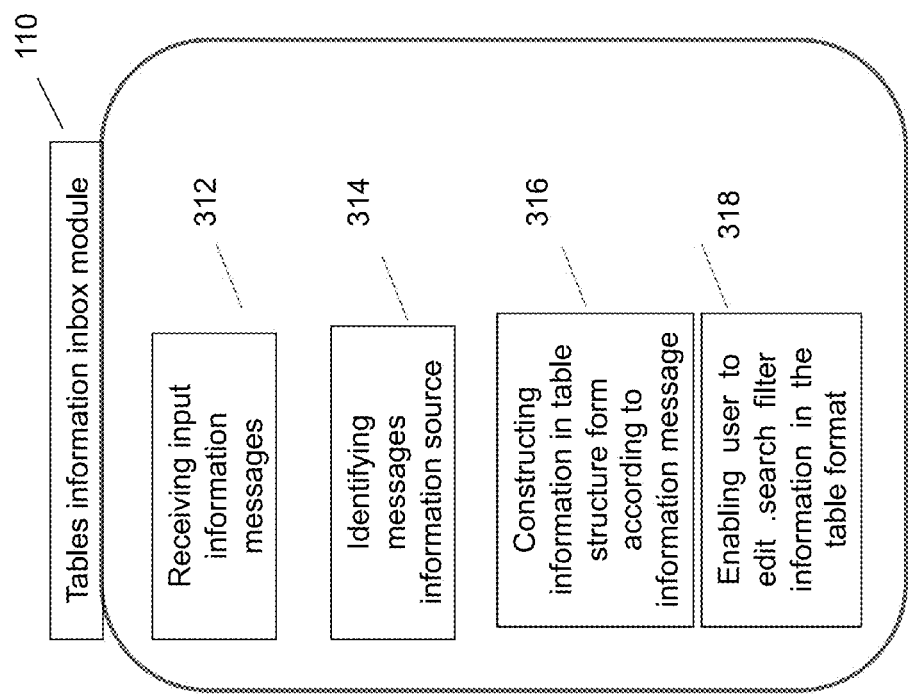
FIG. 3 is a flow chart illustrating the method of the Information table inbox module according to some embodiments of the invention.

FIG. 3 is a flow chart illustrating the method of the tables information inbox module 110 according to some embodiments of the invention. This module enables to view an inbox of all received messages. The inbox may be organized by date or source of information. The information message are retrieved (step 312) through the web application from the database 30. The received information message is analyzed to identify information source (step 314), such as a friend or business entity, enabling to organize the message in sub-folders accordingly. When opening the message, the data information is retrieved in a table structured format (step 316), the information data is presented according to the filtering, editing, selections or sorting operations as determined by the user which sent the information message. The information data is updated to the time of opening the message according to defined query based on the transmitting user operations. The query may be retrieved from the data information table database according to identification number of the query or from the information message.

The user is enabled to browse the information table and edit, search, mark or filter the data as is further described bellow (step 318). When browsing the information table the user may retrieve from the server more information data relating the information table which was filtered by at least one user which sent the message. The user may further use hyperlinks within the information table to receive more relevant information or connect web address related to the message such trailer of a movie or merchandizing website. Optionally the user may send feedback message to the business provider or private user which initially originated the information message.

Figure 4:
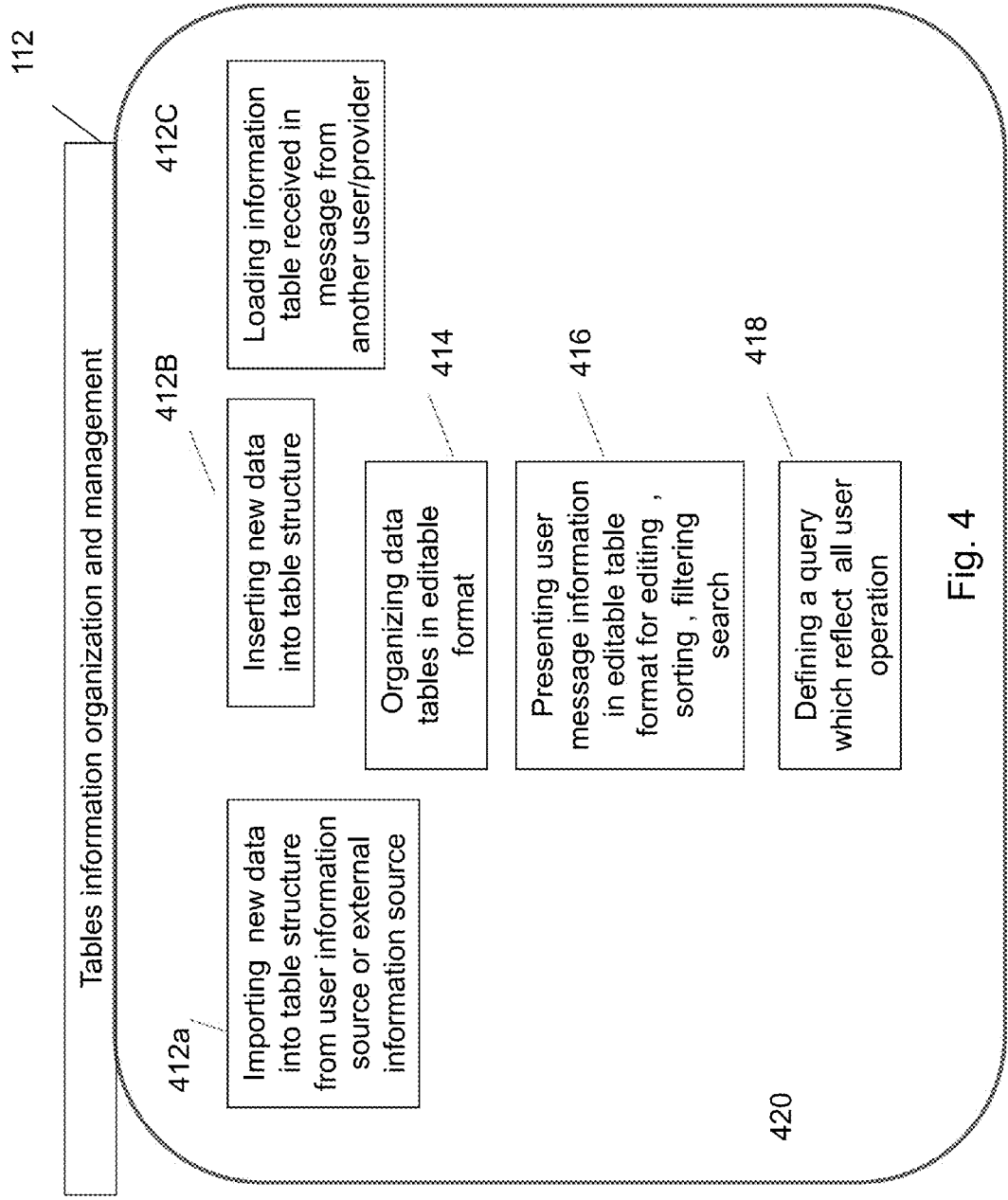
FIG. 4 is a flow chart illustrating the method of Tables information organization and management according to some embodiments of the invention.

FIG. 4 is a flow chart illustrating the method of tables information organization and management according to some embodiments of the invention. The user may initiate and create new message using his smart phone, the information may be imported from external sources (such as the web) or internal data source such as data sheet file (step 412A), insert manually new data into structured table such as list of products to buy (step 412B) or loaded from another information message received from a third party (step 412C). Optionally new data may be gathered using a camera installed in the user smart phone or GPS unit for using location data.

Once the data is inserted, the module organizes the data in a table structured format such as table (step 414) and presented to the user in editable table format (step 416). Now the user can edit, sort, filter search or manipulate the data in the information table (step 418). After the user finished editing the information table and decided to send an information message, all user operation are assembled to create a query which enable to create or present the information table in the state format as edited by the user (step 418). Optionally the information table itself can be transmitted as part of the information message.

Figure 5:
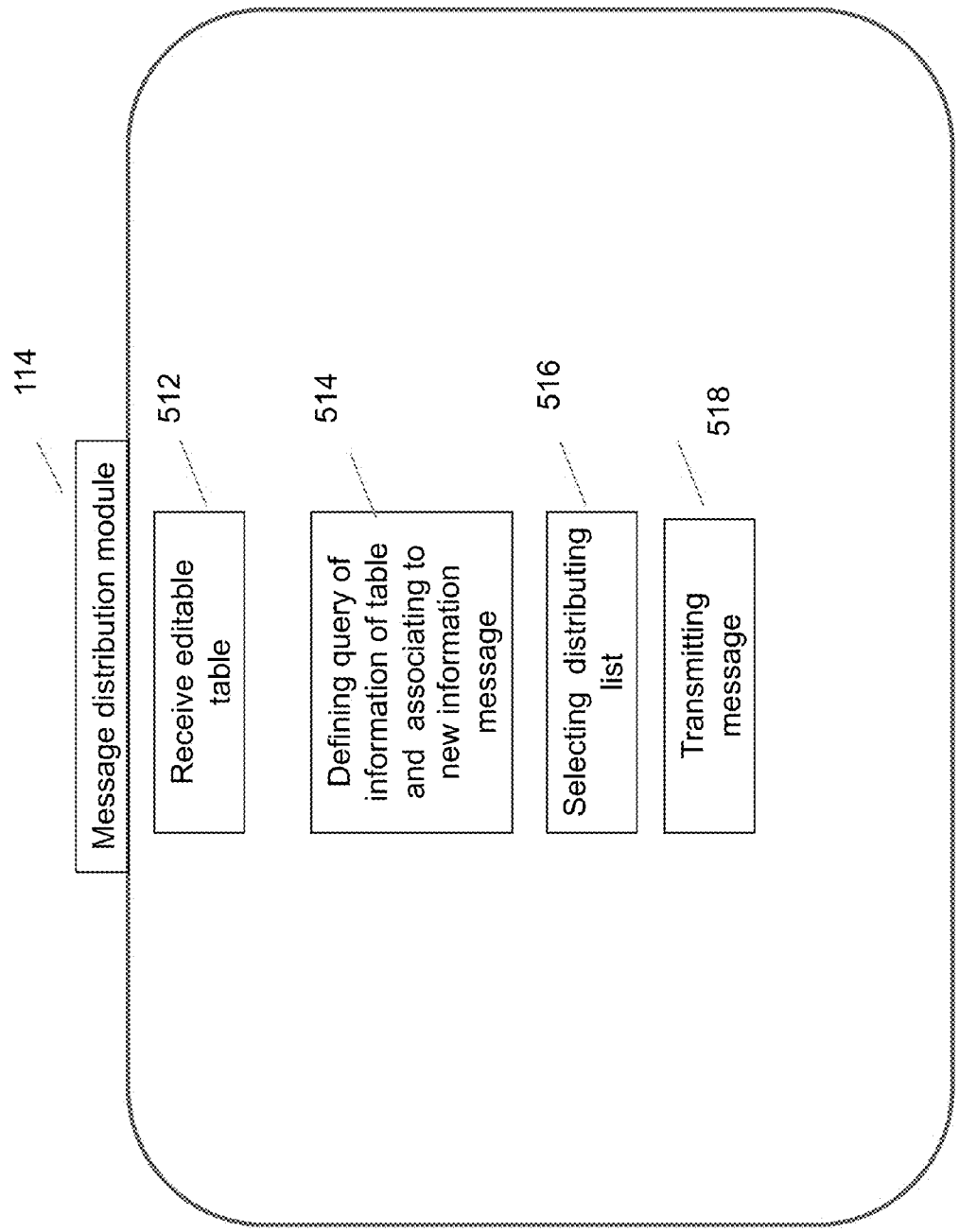
FIG. 5 is a flow chart illustrating the method of Message distribution module according to some embodiments of the invention.

FIG. 5 is a flow chart illustrating the method of message distribution module according to some embodiments of the invention. Once the user finished creating and/or editing the message he may distribute the message to any selected recipients. The module receives the ready to go table structured information data (step 512) and associates the created query into new information message (step 514). At the next step the user selects from an address book or inserts manually the users addresses to determine the distribution list (step 516). At the final step (518) the messages are distributed through the server web application (20) to their destination.

Figure 6:
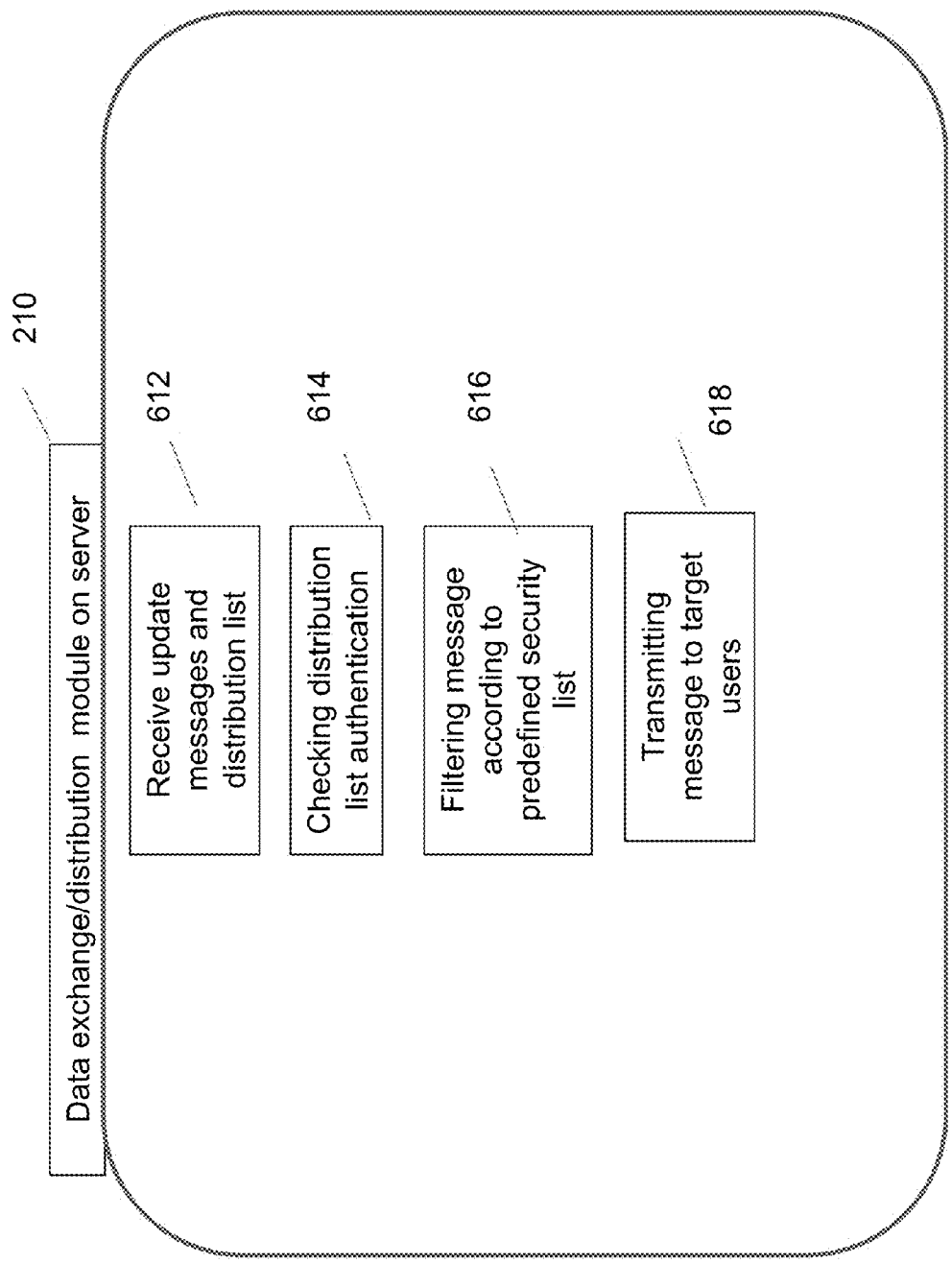
FIG. 6 is a flow chart illustrating the Data exchange/distribution module on server according to some embodiments of the invention.

FIG. 6 is a flow chart illustrating the Data exchange/distribution module on the server according to some embodiments of the invention. The module receives updated messages from users or organizations and distribution list (step 612). The correctness and authentication of the distribution list is checked for preventing spamming (step 614). The message content or the distribution list can be filtered according to predefine security or customization rules, for example users may define filtering according to frequency of updates or relevancy of message content (step 616). After determining the final distribution list the messages are transmitted to their destinations to be received by client Tables information inbox module (110).

Figure 7:
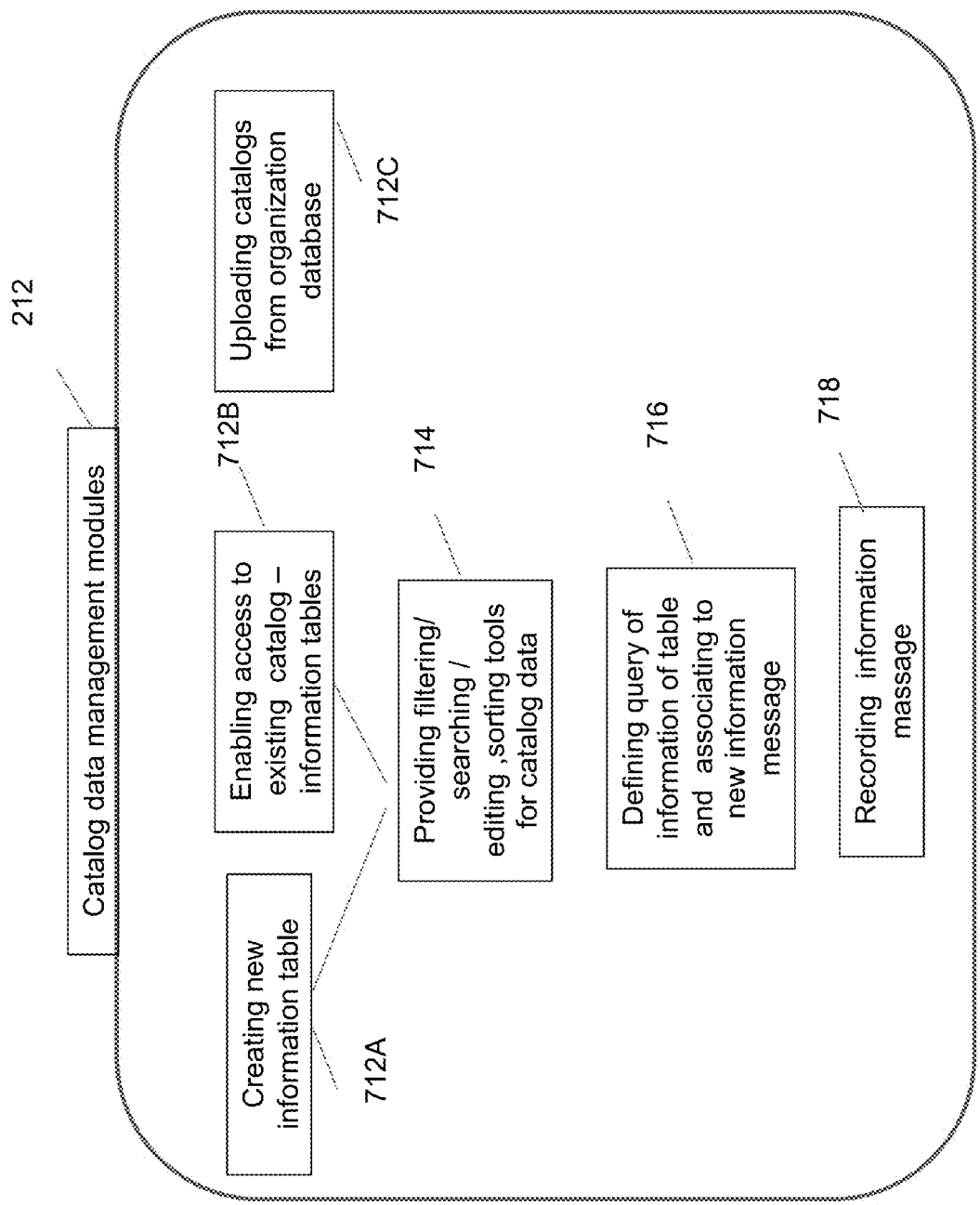
FIG. 7 is a flow chart illustrating the method of Catalog data management modules according to some embodiments of the invention.

FIG. 7 is a flow chart illustrating the method of the catalog data management module according to some embodiments of the invention. This module is intended for business users, enabling to create information tables and corresponding information message based on their business catalogs. The information can be retrieved from business catalog software or for small business can be manually loaded by the user by copying or inserting data. The catalog management module enables the creation of new information tables (step 712A), access existing catalog—information tables (step 712B) or upload information from the business organization enabling to connect/synchronize with the enterprise legacy systems (e.g. CRM, ERP, Billing, etc.). The user is provided with tools for filtering, editing, marking/selecting, or sorting the information tables out of the business catalog data which are customized according to profile of user or requirements of a defined campaign (step 714). After preparing the information tables is created query reflecting all operations of the user associating the query to new information message (step 716). At the last step the new message is recorded (step 718).

Figure 8:
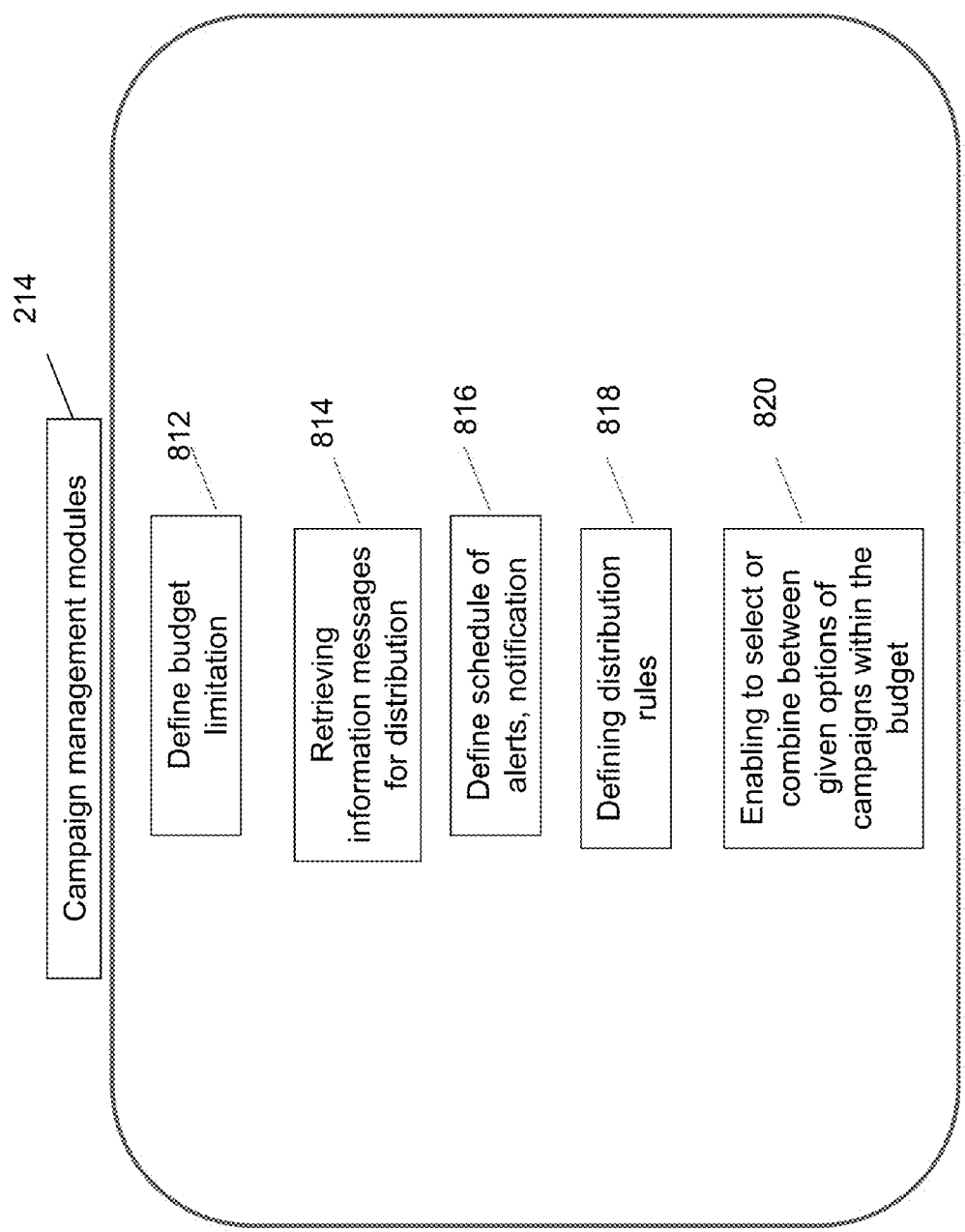
FIG. 8 is a flow chart illustrating the method of Campaign management modules according to some embodiments of the invention.

FIG. 8 is a flow chart illustrating the method of campaign management module 214 according to some embodiments of the invention. This module provides an advanced mode of distributing information messages for business entities. It is suggested to provide campaign planning tool by defining campaign budget (step 812), retrieving information messages (step 814) defining schedule of alerts, notification according marketing plan (step 816) and defining distributions lists according to marketing user profiles or geographical location of users (step 818). Based on these definitions and selections the module suggest the user optional plans for distributing information messages within the budget limits, considering user marketing requirement (step 820). The user is enabled to select one of available options or integrated plan by defining weights to different marketing requirements (step 820). In case user defined the distribution list according geographical location or an updating frequency, the message are automatically sent according to the definitions: upon arriving a specific destination or at the defined scheduling.

Figure 9:
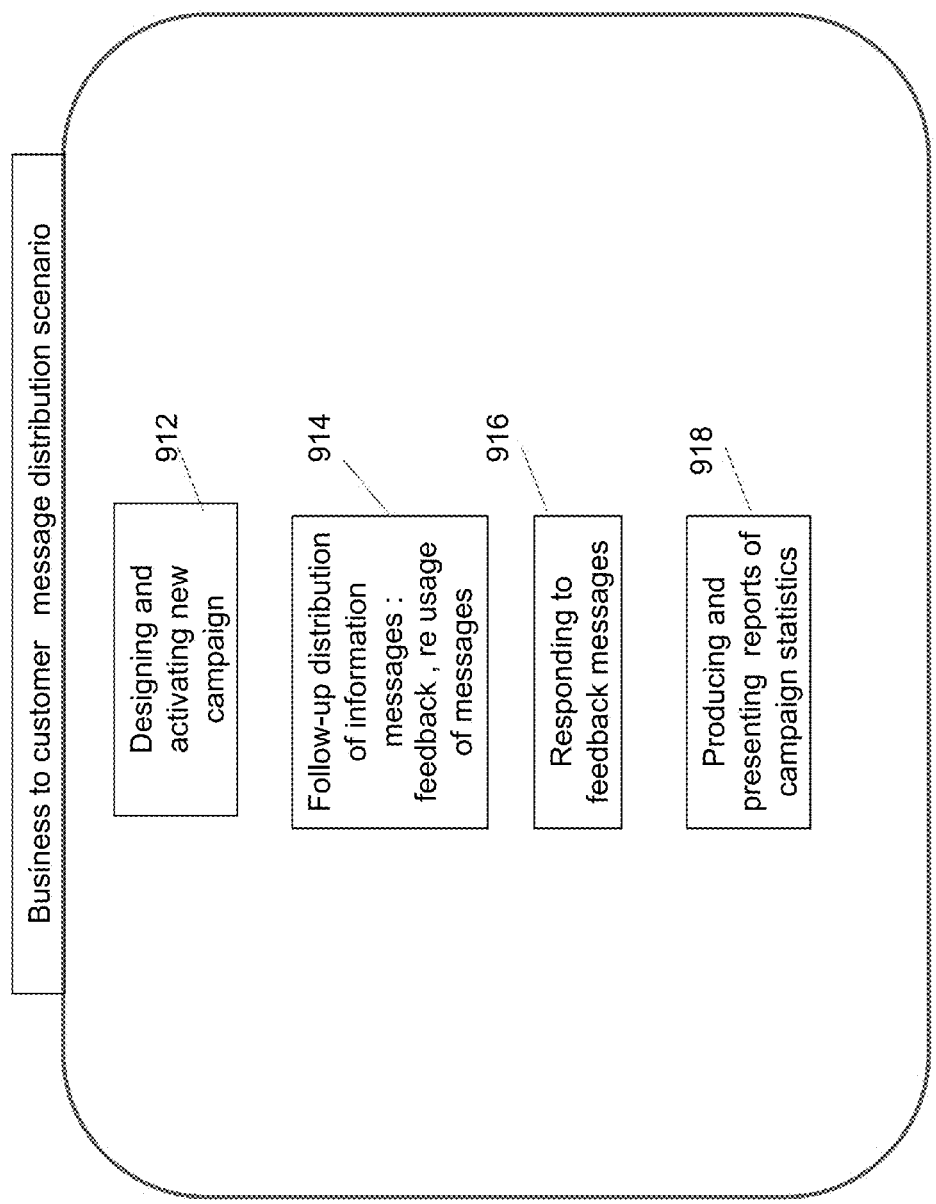
FIG. 9 is a flow chart illustrating the method of Business message distribution scenario according to some embodiments of the invention

FIG. 9 is a flow chart illustrating the method of business to customer message distribution scenario according to some embodiments of the invention. A business to customer distribution scenario may include the steps of designing and activating new campaign as described above (step 912), follow-up distribution of information messages: receiving feedback of user, monitoring re-usage of messages (step 914), for example a cinema may send a user a list of films, a first user may filter the list and send it to his friends inviting them to join him, his friends may responds by selecting one or more films from the list, these re-usage of the films is monitored and reported to the cinema by following up all queries which were created on the basis of the initial information message. The business may respond to the users feedback and users selections (step 916) the respond may include more information regarding a product or service in a catalog such as sale related to the product. According to some embodiments of the present invention the business which distribute information message to clients may suggest benefits to user which make re-use of the message to their friends. For example a user which organize a group of friends to purchase the same products or services, may receive a discount.

Figure 10:
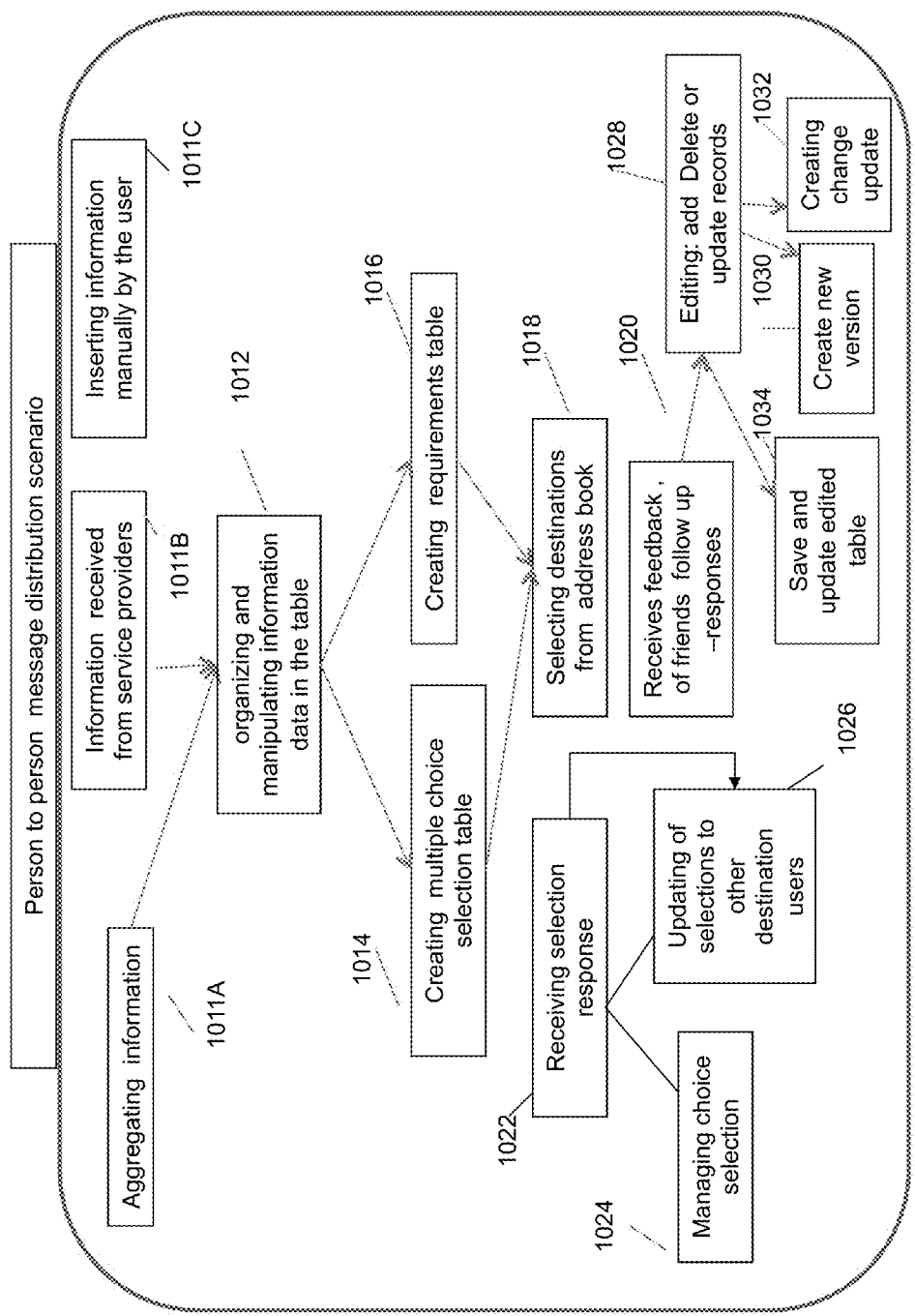
FIG. 10 is a flow chart illustrating the method of Private message distribution scenario according to some embodiments of the invention.

Based on gathered statistics of information message distribution and follow-up are produced reports which summarize the gathered statistics for user convenience (step 918). The reports may include information of the users actions, e.g. how many messages were opened, which items were viewed, which information was shared with friends, which users replied to the advertiser, etc FIG. 10 is a flow chart illustrating the method of Person to person message distribution scenario according to some embodiments of the invention. A user may organize and manipulate information data (step 1012) received from a provider (such as a cinema) (step 1011B) or gather information by capturing image using the phone camera (step 1011A) or inserting information manually by the user (step 10011C). The information may be organized in multiple choice selection table (step 1014), for example options for places to go with friends, or optionally information may be organized as requirements list, such as buying list (step 1016). For each option of information message the user selects destination addresses (step 1018). The user receives feedback for the information table message which may include selection of choices (1022). Once receiving the users voting by the initiating user, the application may enable the initiating user to manage the voting's results and provides the user with a table including aggregated information of user's voting's results (1024). Optionally the voting's results may be sent to all destination addresses selected by the originator user (step 1026). The users voting's results may be further sent to the provider which the information in the table is related to.

In person to person scenarios the client application enables each user to edit the information tables, by adding, deleting or changing records (step 1028). Once the user edited the information table, several options are available: saving the edited information table (step 1034), create and store new version of the information table while marinating the previous versions (step 1030) or create and save a record of all changes (step 1032).

According to some embodiment of the present invention the information messages may include online or offline advertising—the message can display pre-defined advertisements inside the message body. Offline ads can be displayed randomly or according to the user-profile. Online ads can be determined according to online data operations that the mobile user performs while viewing the message (e.g. if the user had filtered a specific item from a catalogue, as response the provider may send him a coupon or suggesting a special discount) or message related on user current location.

According to some embodiments of the present invention the messaging platform may be associated with to Social Networks (such as Facebook, Google Plus, Twitter, YouTube, etc.).—mobile users can send and receive information messages to their friends through various social networks platforms and can receive responds to their mobile device.

FIGS. 11-17 are screen shots illustrations of different information table formats according to some embodiments of the invention.

According to some embodiments of the present invention are suggested personal usages applications enabling the mobile user to easily create and share rich personal content and interact on it, such as: Follow-up on collaborative tasks—creating Shopping lists, To-Do lists, etc. and share them with a friends. See FIG. 11, Collaborative decision making with friends e.g. decide within a group of friends where to go out together, consult with a friend which product to buy from a list of options, etc. See FIG. 12, or Sharing rich multimedia content—See FIG. 13.

Each Information-Message enables the mobile user to search, sort and filter the message data and share the relevant data with his friends (Social marketing).

Figure 11:
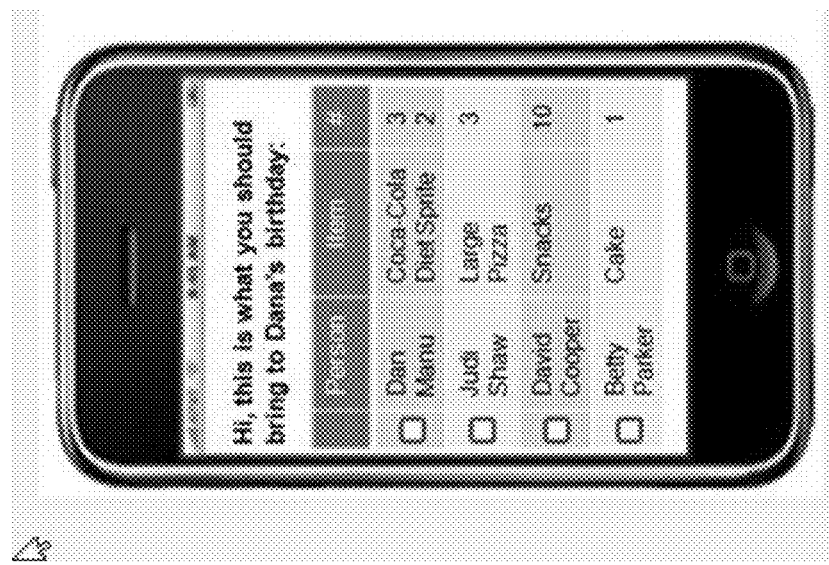
FIGS. 11-17 are a illustration of a screen shots of different information table formats according to some embodiments of the invention.

FIG. 11 illustrates a screen shot of task list shared by friends, in this case the sharing a shopping list for a birthday party, each row of the list include information related to the task: the person assigned to the task, the assigned task (product to buy), and quantity of products. The table can include any type of information such as text, hyperlinks to internal or external sources images, dates, video, number, or audio item. Each user can update the information tables and sharing it with other user by transmitting an information message.

Figure 12:
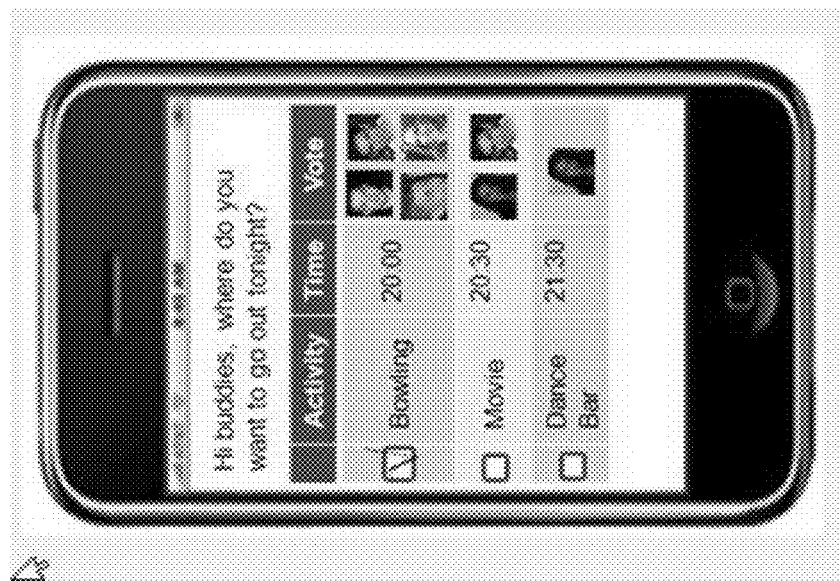

FIG. 12 illustrates a screen shot of choice list shared by friends, in this case the sharing an event list for a suggesting possible option of going out, Each row of the list include information related to the event: type of event, schedule of event and the friends' voting results. The table can include any type of information such as text, hyperlinks to internal or external source, images, dates, video, number or audio item. Each user can update the information tables and sharing it with other user by transmitting an information message. This information table support multi choice management between a group of users.

Figure 13:
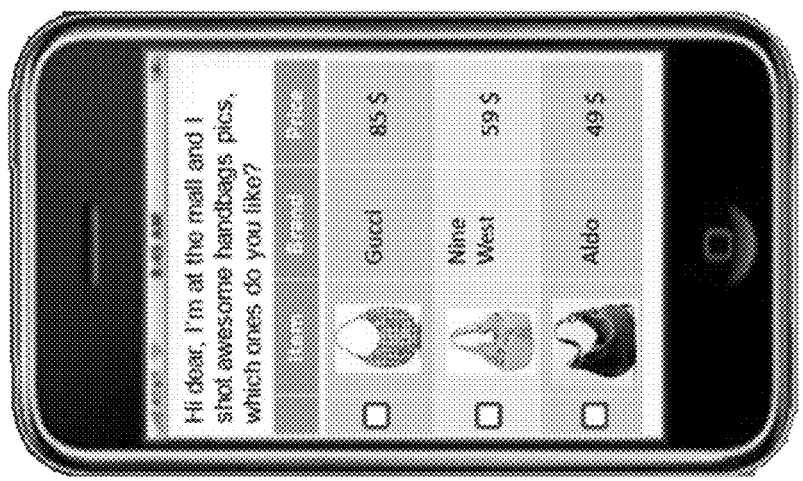

FIG. 13 illustrates a screen shot of shopping items list created in real-time by taking pictures of items. Each row of the picture of an item and relevant information such as shopping details of names of products and prices. The table can include any type of information such as text, hyperlinks to internal or external source, images, dates, video, number or audio item. Each user can update the information tables and sharing it with other user by transmitting an information message.

According to some embodiments of the present invention are suggested Business-to-Customer Applications enabling a publisher to easily create and deliver mobile campaigns through a simple user interface, such as: Electronic Catalogues—Menus of products/services to potential customers, Coupons' lists by customers clubs to its members, etc. See FIG. 14,15, Voting/Surveys—reality shows candidates voting, customer service improvement survey, etc. See FIG. 16, Events Schedules—time tables of transportation lines, entertainments events, courses list, etc. See FIG. 17.

The IMS application enables marketers to send out a more personalized and relevant offer, increasing customer satisfaction and loyalty.

Figure 15:
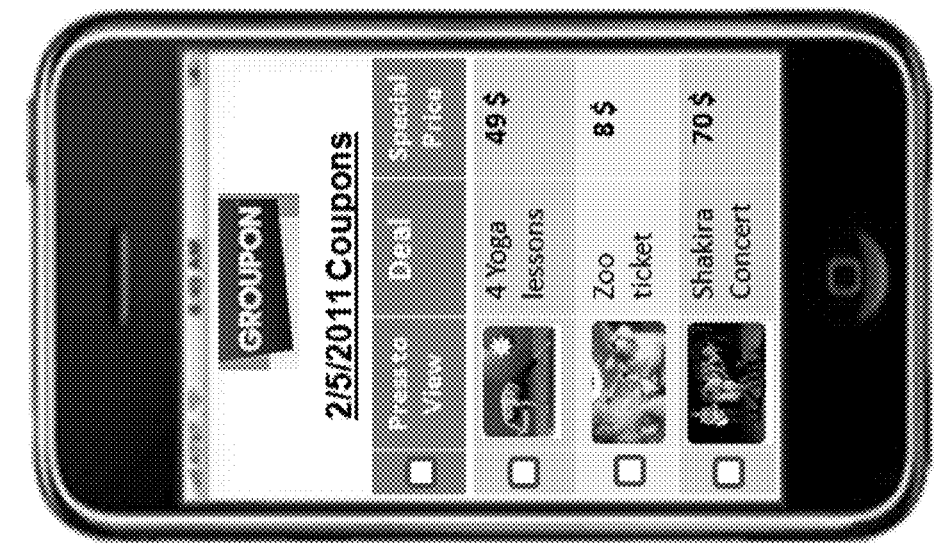
Figure 14:
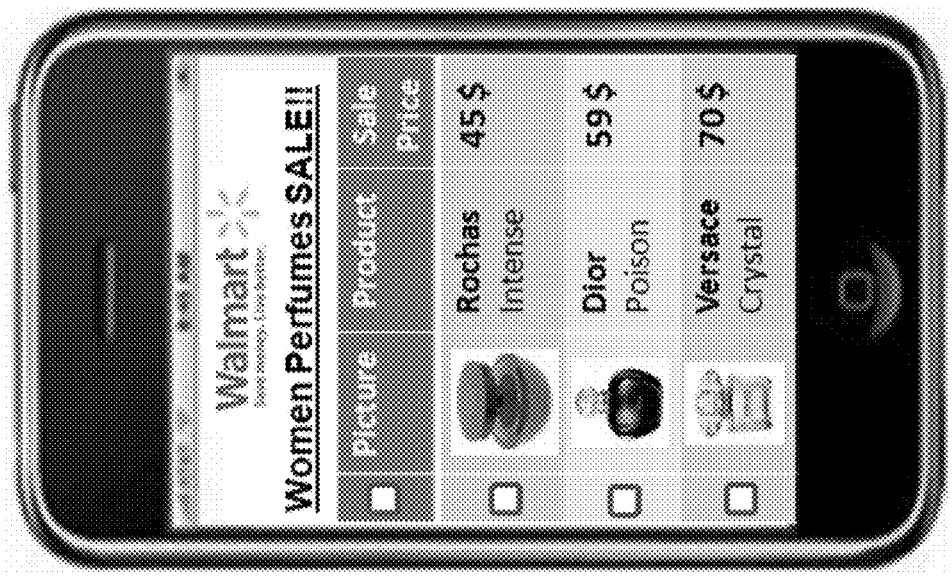

FIGS. 14,15 illustrate screen shots of promotional message including information of product sale, each row including product images, name, price or discount or coupon. The user receiving this message may select the desired product to buy or may edit the table by selecting some of the products and sending the edited table to his friends or back to the provider using an information messages.

Figure 16:
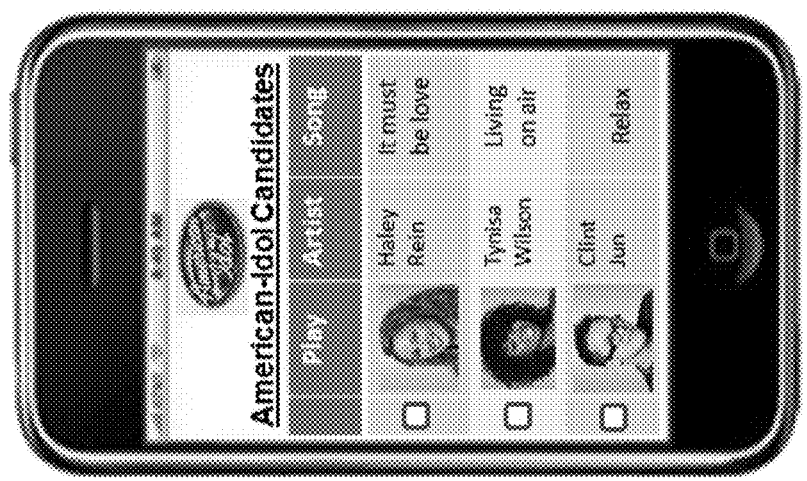
Figure 17:
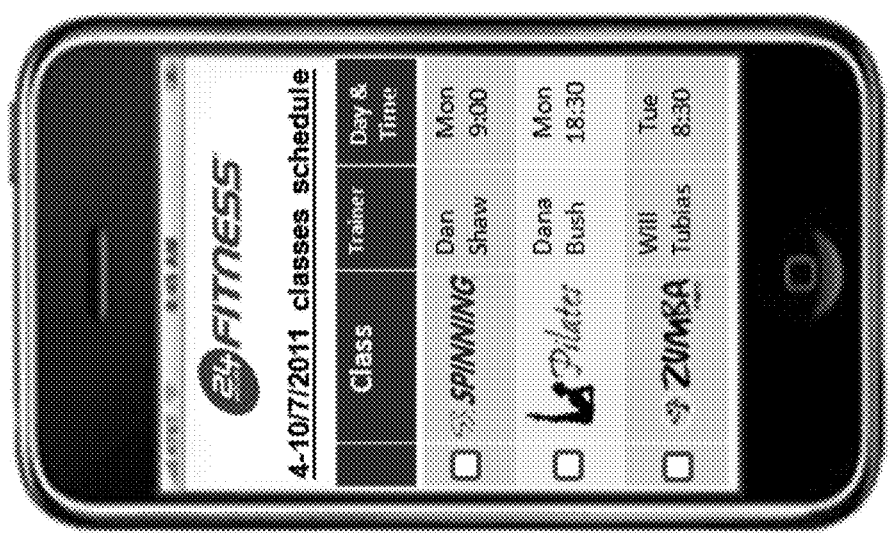

FIG. 16 illustrates a screen shot of voting table related to real time contest, in this voting for American idol candidates. Each row of the list include information related to the candidate of the contest: Image of the candidate, name and relevant song. The table can include any type of information such as text, hyperlinks to internal or external source, images, dates, video, or audio item. Each user can update the information tables and sharing it with other user by transmitting an information message. This information table support voting by multiple viewers enabling each viewer to vote by sending information message including selection within the information tables.

FIG. 7 illustrates a screen shot of schedule list shared distributed by providers to their customers, in this case the schedule of a jim. Each row of the list event name, related information timing. The table can include any type of information such as text, hyperlinks to internal or external source, images, dates, video, or audio item. Each user can schedule for an event by selecting in within the information tables an transmitting an information message of the edited information table.

According to some embodiments of the present invention, is suggested to distribute the information tables, using short messages protocols or electronic mails for recipients who have not installed the designated client application 10. When opening the messages using SMS or emails the users are transferred to a designated webpage enabling them, only to view the information tables with no editing options.

According to some embodiments of the present invention, is suggested to enable user to pull information messages from specific providers. The pull operation can be implemented by call or sending message to target number related to desired information message and receive in return, the desired information message. Optionally the pull operation can be implemented by associating a designated barcode to an information message, enabling to pull the information message by reading the barcode using the client application on the user phone device. According to other options the information messages can be stored in libraries by categories, enabling users to access the libraries and retrieve information messages by category.

According to some embodiments of the present invention the client application 10 is programmed to locate in the contact list all users which installed the designated client application on their phone device. Hence the user is updated with all users having the designated application.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A method for creating manipulating exchanging and distributing information messages of organized table data structure between at least two wireless computerized terminals of different users, said method comprises the steps of:
- providing a mobile application on the wireless computerized terminal for organizing information data by a first user into table structured format, wherein the information data is retrieve from defined databases or manually inserted by the user, wherein the organizing includes user operations of searching, sorting, filtering manipulating and editing the information data;
- defining a query which represents the organized information in the structure format based on the first user operations and associating said query with an information message having predefined format;
- enabling to distribute information message to at least one second user through wireless communication data network;
- providing a second user with a mobile application on the wireless computerized terminal having the following capabilities: enabling to receive the distributed information message, organizing the received message information in the same table structured format as created by the first user according to associated query and enabling manipulating, editing, searching, sorting, filtering the data rerecords by the second user;
- defining a query which represents the organized information in the structure format based on second user operations and associating said query with an information message having predefined format;
- enabling to distribute information message to at least one second user through wireless communication data network; and
- enabling to distribute information message to at least one other user through wireless communication data network.

2. The method of claim 1 wherein the associating includes assigning an identification number for the created query and including this number in the information message.

3. The method of claim 1 wherein the associating further comprise the insertion of the query in the information message.

4. The method of claim 1 wherein the mobile communication application further enables to view data records of information tabled filtered by the transmitting user.

5. The method of claim 1 wherein the mobile application further enables to follow-up feedback to information message which define multiple choice table to plurality of second users, said follow-up enabling to aggregate second users selections.

6. The method of claim 5 wherein the follow-up further includes monitoring re-usage of information messages by secondary users and their distribution statistics.

7. The method of claim 1 wherein the table structured format is transformed to one of the following: graphical format, time line, or map format.

8. The method of claim 1 further comprising planning optimized information messages distribution according to marketing requirements.

9. The method of claim 1 wherein the information table initially originated by a private user can be edited by recipient users including adding, deleting or changing information, wherein the information table is saved in one of the following options: overriding the last version of the information table, creating new version of the information table and saving previous message or recording of the changes in association with the information table.

10. A system for creating, manipulating, exchanging and distributing information message of organized data structure between at least two computerized terminal of different users, said system comprised of:
- An application installed on a mobile terminal device, said application including:
  - i. an information module for receiving and transmitting updated information messages of multiple data sources and;
  - ii. an organizing data module for organizing information data by a user into structured table format, wherein the information data is retrieved from defined databases or manually inserted by the user, wherein the organizing include searching, sorting, filtering manipulating and editing the information data;
  - iii. a message distribution module for defining a query which represents the organized information in the structure format based on first user operations and associating said query with an information message having predefined format and transmit the information messages according to user distribution list;
- a web server application including:
  - I. a tables data management module enabling online creating, updating, manipulating, filtering sorting and searching of information data tables of plurality of data information providers and;
  - II. a data exchange module managing distribution information messages between plurality of information sources and target mobile terminals.

11. The system of claim 10 wherein the associating includes assigning an identification number for the created query and including this number in the information message.

12. The system of claim 10 wherein the associating includes insertion of the query in the information message.

13. The system of claim 10 wherein the mobile communication application further enables to view data records of information tabled filtered by the transmitting user.

14. The system of claim 10 wherein the mobile application further enables to follow-up feedback to information message which define multiple choice table to plurality of second users, said follow-up enabling to aggregate second users selections.

15. The system of claim 14 wherein the follow-up further includes monitoring re-usage of information messages by secondary users and their distribution statistics.

16. The system of claim 10 wherein the table structured format can be presented by one of the following: graphical format, time line or map format.

17. The system of claim 10 further comprising campaign management tool for planning optimized information messages distribution according to marketing requirements.

18. The system of claim 10 wherein the information table initially originated by a private user can be edited by recipient users including adding, deleting or changing information, wherein the information table is saved in one of the following options: overriding the last version of the information table, creating new version of the information table or recording of the changes in association with the information table.

19. The system of claim 10 wherein the client application 10 is programmed to locate in the user's contact list all users which installed the designated client application on their phone device, providing the user an updated list with all users having the designated application.

20. The system of claim 10 wherein the information message is distributed automatically according to at least one of user geographical location, predefined scheduling rules, user profile rules.

21. The system of claim 10 wherein messages are associated to social networks, enabling users to send and receive information messages through the social network.

* * * * *